(12) United States Patent
Willems et al.

(10) Patent No.: US 7,825,173 B2
(45) Date of Patent: Nov. 2, 2010

(54) PROCESS FOR THE PRODUCTION OF AQUEOUS BINDER LATICES

(75) Inventors: Tonnie Willems, Leverkusen (DE); Matthieu Barrere, Duesseldorf (DE); Kok-Far Lee, Wuppertal (DE); Frank Tessari, Wuppertal (DE); Stefan Wiggershaus, Schwelm (DE); Paul P. Bruylants, Hever (BE); Eric C. Houze, Southfield, MI (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1225 days.

(21) Appl. No.: 11/273,834

(22) Filed: Nov. 15, 2005

(65) Prior Publication Data
US 2006/0247357 A1 Nov. 2, 2006

Related U.S. Application Data

(60) Provisional application No. 60/676,346, filed on Apr. 29, 2005.

(51) Int. Cl.
*C08F 265/02* (2006.01)
*C08F 265/06* (2006.01)
*C09D 151/00* (2006.01)

(52) U.S. Cl. .................. 523/201; 524/460; 526/201

(58) Field of Classification Search ............... 523/201; 524/460; 526/201
See application file for complete search history.

(56) References Cited

U.S. PATENT DOCUMENTS 5,618,888 A * 4/1997 Choi et al. ............. 525/301

FOREIGN PATENT DOCUMENTS

| EP | 1 008 635 | | 6/2000 |
|---|---|---|---|
| EP | 1008635 A1 | * | 6/2000 |
| WO | WO 03/064487 | | 8/2003 |

* cited by examiner

*Primary Examiner*—Kelechi C Egwim
(74) *Attorney, Agent, or Firm*—Sudhir G. Deshmukh

(57) ABSTRACT

A process for the production of aqueous binder latices by multistage emulsion polymerization in the aqueous phase, comprising the successive steps:
1) free-radical polymerization of a mixture A of olefinically unsaturated, free-radically polymerizable monomers, comprising at least one monomer with at least one acid group in a proportion corresponding to an acid value of mixture A of 10 to 100 mg of KOH/g and 0.5 to 5 wt. % of at least one olefinically polyunsaturated monomer, in the aqueous phase,
2) neutralization of acid groups of the polymer formed in process step 1) and
3) free-radical polymerization of at least one mixture B of olefinically unsaturated, free-radically polymerizable monomers, comprising at least one monomer with at least one acid group in a proportion corresponding to an acid value of mixture B or each of the mixtures B of 0 to below 5 mg of KOH/g, at least one monomer with at least one hydroxyl group in a proportion corresponding to a hydroxyl value of mixture B or each of the mixtures B of 0 to below 5 mg of KOH/g and at least one olefinically polyunsaturated monomer in a proportion of 0.5 to 5 wt. %, relative to mixture B or each of the mixtures B, in the presence of the product obtained in process step 2), wherein the ratio by weight of mixture A to the at least one mixture B is from 15:85 to 85:15 and wherein neutralization is not begun in process step 2) until at least 90 wt. % of the monomers of mixture A have been polymerized to completion.

10 Claims, No Drawings

PROCESS FOR THE PRODUCTION OF AQUEOUS BINDER LATICES

FIELD OF THE INVENTION

The present invention relates to a process for the production of aqueous binder latices, to the aqueous binder latices produced using the process and also to use thereof as binders in aqueous coating compositions.

BACKGROUND OF THE INVENTION

EP 300 612 A1 discloses aqueous core-shell polymer particles with a crosslinked core and a stabilizing shell with salt groups usable as binders in water-borne base coats useful for the production of base coat/clear coat two-layer coatings. As is clear from the Examples section of EP 300 612 A1, the core-shell polymer particles are produced by initially emulsion polymerizing a mixture of olefinically unsaturated, free-radically polymerizable monomers, which mixture comprises olefinically polyunsaturated monomers, but no acid-functional monomers, and then, in the presence of the resultant emulsion polymer, emulsion polymerizing a monomer mixture which comprises acid-functional monomers but no olefinically polyunsaturated monomers, followed by neutralization of the acid groups.

WO 01/72909 discloses aqueous emulsion polymers usable as binders in water-borne base coats useful for the production of base coat/clear coat two-layer coatings, which emulsion polymers are produced by emulsion polymerization of a first monomer mixture comprising olefinically unsaturated, acid-functional monomers and no olefinically polyunsaturated monomers, neutralization of the acid groups of the emulsion polymer obtained in this manner and subsequent emulsion polymerization of a second monomer mixture containing olefinically polyunsaturated monomers in the presence of the previously produced emulsion polymer.

U.S. Pat. No. 5,403,894 discloses aqueous core-shell polymer dispersions, from which the core-shell polymer particles may be isolated in the form of a redispersible powder suitable for use as a cement modifier. The aqueous core-shell polymer dispersions are produced by emulsion polymerization of a first monomer mixture comprising olefinically polyunsaturated monomers and olefinically unsaturated, acid-functional monomers, neutralization of the acid groups of the emulsion polymer obtained in this manner and subsequent emulsion polymerization of a second monomer mixture in the presence of the previously produced emulsion polymer. The second monomer mixture here contains no olefinically polyunsaturated monomers. It is neither mentioned nor suggested that the aqueous core-shell polymer dispersions may be used as binders in water-borne base coats useful for the production of base coat/clear coat two-layer coatings.

It has now been found that emulsion polymers which are particularly suitable as binders in water-borne base coats useful for the production of base coat/clear coat two-layer coatings may be obtained if said emulsion polymers are produced by multistage emulsion polymerization, olefinically polyunsaturated monomers are copolymerized in all the stages of the emulsion polymerization and olefinically unsaturated monomers with acid groups are copolymerized in the first stage of the emulsion polymerization and if, after completion of the first stage of the emulsion polymerization, the acid groups are neutralized. The use of olefinically polyunsaturated monomers in all the stages of the emulsion polymerization ensures that the polymer products formed in each stage of the emulsion polymerization exhibit a crosslinked structure or even a gel structure.

SUMMARY OF THE INVENTION

The invention relates to a process for the production of aqueous binder latices by multistage emulsion polymerization in the aqueous phase, comprising the successive steps:

1) free-radical polymerization of a mixture A of olefinically unsaturated, free-radically polymerizable monomers, comprising at least one monomer with at least one acid group in a proportion corresponding to an acid value of mixture A of 10 to 100 mg of KOH/g and 0.5 to 5 wt. % of at least one olefinically polyunsaturated monomer, in the aqueous phase,
2) neutralization of acid groups of the polymer formed in process step 1) and
3) free-radical polymerization of at least one mixture B of olefinically unsaturated, free-radically polymerizable monomers, comprising at least one monomer with at least one acid group in a proportion corresponding to an acid value of mixture B or each of the mixtures B of 0 to below 5 mg of KOH/g, at least one monomer with at least one hydroxyl group in a proportion corresponding to a hydroxyl value of mixture B or each of the mixtures B of 0 to below 5 mg of KOH/g and at least one olefinically polyunsaturated monomer in a proportion of 0.5 to 5 wt. %, relative to mixture B or each of the mixtures B, in the presence of the product obtained in process step 2), wherein the ratio by weight of mixture A to the at least one mixture B is from 15:85 to 85:15 and wherein neutralization is not begun in process step 2) until at least 90 wt. % of the monomers of mixture A have been polymerized to completion.

By "aqueous binder latices", it is meant water-dispersed emulsion polymers, i.e. water-dispersed polymer particles prepared by emulsion polymerizing free-radically polymerizable olefinically unsaturated monomers, said emulsion polymers being usable as film-forming binders in water-borne coating compositions, particularly in water-borne base coats of base coat/clear coat finishes.

DETAILED DESCRIPTION OF THE EMBODIMENTS

In the process according to the invention, aqueous binder latices are produced by a multistage, preferably two-stage emulsion polymerization, i.e. the mixtures A and B of olefinically unsaturated monomers to be free-radically polymerized are polymerized under conventional conditions known to the person skilled in the art of a free-radical polymerization performed in an aqueous emulsion, i.e. using one or more emulsifiers and with the addition of one or more initiators which are thermally dissociable into free radicals. In order to ensure the formation of a crosslinked or even gel structure in the polymer products formed in each stage of the emulsion polymerization, olefinically polyunsaturated monomers are used and copolymerized in each stage of the emulsion polymerization. The duration of the emulsion polymerization (time taken to apportion mixtures A and B into the aqueous initial charge plus the duration of the neutralization operation of process step 2) plus the duration of the post-polymerization phase) is, for example, 1 to 10 hours. The polymerization temperature in the aqueous phase is, for example, 50 to 95° C.

The emulsifier(s) is/are used in a conventional total quantity of, for example, 0.1 to 3 wt. %, relative to the sum of the weights of mixtures A and B and may be initially introduced and/or added as a constituent of the mixtures A and B and/or added in parallel to the apportionment of mixtures A and B. Examples of usable emulsifiers are the conventional cationic, anionic and nonionic emulsifiers usable in the context of emulsion polymerization, such as, for example, cetyltrimethylammonium chloride, benzyldodecyldimethylammonium bromide, sodium dodecyl sulfate, sodium dodecylbenzenesulfonate, polyethylene glycol monolauryl ether. Care must be taken to ensure that cationic and anionic emulsifiers are not used with one another.

The initiator(s) which are thermally dissociable into free radicals (free-radical initiators) are used in a conventional total quantity of, for example, 0.02 to 2 wt. %, relative to the sum of the weights of mixtures A and B and may be added contemporaneously to the apportionment of mixtures A and B. The water-soluble free-radical initiator(s) may be added as such, as a constituent of mixtures A and B, but in particular as an aqueous solution. A proportion of the free-radical initiator(s) may, however, be initially introduced and/or added once addition of the monomers is complete. It is also possible to add the initiator(s) completely prior to the apportionment of mixtures A and B. The free-radical initiator(s) are preferably water-soluble. Examples of usable free-radical initiators are hydrogen peroxide, peroxodisulfates such as sodium, potassium and ammonium peroxodisulfate, ammonium salts of 4,4'-azobis(4-cyanopentanoic acid), 2,2'-azobis(2-methyl-N-1,1-bis(hydroxymethyl)ethyl)propionamide, 2,2'-azobis(2-methyl-N-2-hydroxyethyl)propionamide as well as conventional redox initiator systems known to the person skilled in the art, such as hydrogen peroxide/ascorbic acid optionally in combination with catalytic metal salts such as iron, copper or chromium salts.

The monomer mixtures A and B to be free-radically polymerized according to process steps 1) and 3) are apportioned, i.e. added, as is usual in emulsion polymerizations, into an aqueous initial charge, which has generally already been adjusted to the polymerization temperature. Process steps 1) and 3) consequently comprise the apportionment of mixtures A and B and are started by the beginning of the particular apportionment. Mixtures A and B are apportioned one after the other according to successive process steps 1) and 3), wherein apportionment of the one or more mixtures B is begun with process step 3), but at the earliest after completion of process step 2), i.e. at the earliest once at least 90 wt. % of the monomers of mixture A have been polymerized to completion and the neutralization according to process step 2) has been performed. The extent to which the polymerization has been taken to completion may readily be determined by determining the solids content. Apportionment of the at least one mixture B into the aqueous initial charge may thus begin at the earliest after apportionment of 90% of mixture A and the subsequent addition of the neutralizing agent in process step 2), which corresponds to the case of a very high rate of polymerization with virtually instantaneous 100% polymerization conversion. In general, however, mixture A) is initially apportioned in its entirety during process step 1), after which the neutralizing agent is added in process step 2) once the mixture A) monomers have been at least 90%, preferably completely, polymerized and only thereafter, during process step 3), is the at least one mixture B apportioned.

The acid groups of the polymer obtained in process step 1) are neutralized using conventional basic neutralizing agents, such as ammonia and in particular amines and/or aminoalcohols such as, for example, triethylamine, dimethylisopropylamine, dimethylethanolamine, dimethylisopropanolamine and 2-amino-2-methyl-1-propanol.

The basic neutralizing agents are added in accordance with a degree of neutralization of, for example, 10 to 100%. A degree of neutralization of 100% here corresponds to a stoichiometric neutralization of each acid group in the polymer arising from mixture A. For example, the degree of neutralization is selected dependent on the solids content of the aqueous binder latex obtained after completion of the process according to the invention and also dependent on the acid value of mixture A. In general, a low degree of neutralization is selected in the case of elevated acid values and an elevated solids content and vice versa.

The term "mixture" used in connection with mixtures A and B does not exclude separate apportionment of the particular monomers, i.e. the monomers may also be apportioned individually or as two or more different mixtures of only some of the monomers. It is preferred, however, to apportion real mixtures A and B. Mixtures A and B may also be apportioned in the form of preemulsions.

The ratio by weight of mixture A to the at least one mixture B is 15:85 to 85:15.

Mixture A comprises at least one olefinically unsaturated, free-radically polymerizable monomer with at least one acid group, specifically in a proportion corresponding to an acid value of mixture A of 10 to 100 mg of KOH/g and 0.5 to 5 wt. % of at least one olefinically polyunsaturated, free-radically polymerizable monomer.

Examples of olefinically unsaturated, free-radically polymerizable monomers with at least one acid group are in particular olefinically unsaturated monomers containing carboxyl groups, such as, for example, (meth)acrylic, itaconic, crotonic, isocrotonic, aconitic, maleic and fumaric acid, semi-esters of maleic and fumaric acid and carboxyalkyl esters of (meth)acrylic acid, for example, beta-carboxyethyl acrylate and adducts of hydroxyalkyl (meth)acrylates with carboxylic anhydrides, such as, for example, phthalic acid mono-2-(meth)acryloyloxyethyl ester. (Meth)acrylic acid is preferred.

The term "(meth)acrylic" is used in the present description and the claims. This means acrylic and/or methacrylic.

Examples of olefinically polyunsaturated, free-radically polymerizable monomers are divinylbenzene, hexanediol di(meth)acrylate, ethylene and propylene glycol di(meth) acrylate, 1,3- and 1,4-butanediol di(meth)acrylate, vinyl (meth)acrylate, allyl (meth)acrylate, diallyl phthalate, glycerol tri(meth)acrylate, trimethylolpropane tri(meth)acrylate, pentaerythritol tetra(meth)acrylate, di- and tripropylene glycol di(meth)acrylate, hexamethylene bis(meth)acrylamide. Further examples are compounds which may be produced by a condensation or preferably by an addition reaction of complementary compounds, which in each case, in addition to one or more olefinic double bonds, contain one or more further functional groups per molecule. The further functional groups of the individual complementary compounds comprise pairs of mutually complementary reactive groups, in particular groups which are capable of reacting with one another for the purposes of a possible condensation or addition reaction.

Examples of olefinically polyunsaturated, free-radically polymerizable monomers produced by a condensation reaction are reaction products formed from alkoxysilane-functional (meth)acrylic monomers after hydrolysis with elimination of alcohol and formation of siloxane bridges. Further examples are reaction products formed from hydroxyalkyl (meth)acrylates and olefinically unsaturated isocyanates blocked on the isocyanate group, such as isocyanatoalkyl (meth)acrylate or m-isopropenyl-alpha,alpha-dimethylbenzyl isocyanate with elimination of the blocking agent and formation of urethane groups.

Examples of olefinically polyunsaturated, free-radically polymerizable monomers produced by an addition reaction are addition products formed from hydroxyalkyl (meth)acrylates and olefinically unsaturated isocyanates, such as isocyanatoalkyl (meth)acrylate or m-isopropenyl-alpha,alpha-dimethylbenzyl isocyanate with formation of a urethane group or reaction products formed by ring-opening addition of the epoxy group of unsaturated epoxy compounds onto the carboxyl group of an unsaturated acid with formation of an ester group and a hydroxyl group, such as, for example, the addition product formed from glycidyl (meth)acrylate and (meth)acrylic acid.

Apart from the at least one olefinically unsaturated, free-radically polymerizable monomer with at least one acid group and the at least one olefinically polyunsaturated, free-radically polymerizable monomer, mixture A also comprises one or more further olefinically unsaturated, free-radically polymerizable monomers. These may comprise functional groups or they may be non-functionalized and they may also be used in combination.

Examples of olefinically unsaturated, free-radically polymerizable monomers without functional groups usable in mixture A are monovinyl aromatic compounds such as styrene, vinyltoluene; vinyl ethers and vinyl esters, such as vinyl acetate, vinyl versatate; maleic, fumaric, tetrahydrophthalic acid dialkyl esters; but in particular (cyclo)alkyl (meth)acrylates, such as methyl (meth)acrylate, ethyl (meth)acrylate, propyl (meth)acrylate, butyl (meth)acrylate, isobutyl (meth)acrylate, tert.-butyl (meth)acrylate, hexyl (meth)acrylate, cyclohexyl (meth)acrylate, ethylhexyl (meth)acrylate, decyl (meth)acrylate, dodecyl (meth)acrylate, hexadecyl (meth)acrylate, lauryl (meth)acrylate and isobornyl (meth)acrylate.

Examples of olefinically unsaturated, free-radically polymerizable monomers with functional groups which may be mentioned are in particular olefinically unsaturated monomers with at least one hydroxyl group, such as allyl alcohol, but in particular hydroxyalkyl (meth)acrylates such as, for example, hydroxyethyl (meth)acrylate, and the hydroxypropyl (meth)acrylates, hydroxybutyl (meth)acrylates isomeric with regard to the position of the hydroxyl group. Further examples are glycerol mono(meth)acrylate, adducts of (meth)acrylic acid onto monoepoxides, such as, for example, versatic acid glycidyl ester and adducts of glycidyl (meth)acrylate onto monocarboxylic acids such as, for example, acetic acid or propionic acid.

If mixture A contains at least one olefinically unsaturated, free-radically polymerizable monomer with at least one hydroxyl group, which may be advantageous, the proportion thereof in mixture A lie(s) in a range corresponding to a hydroxyl value of mixture A of below 60 mg of KOH/g, in particular of 5 to 30 mg of KOH/g.

For example, mixture A may consist of
a) 0.5 to 5 wt. % of at least one olefinically polyunsaturated, free-radically polymerizable monomer,
b) a wt. % proportion corresponding to an acid value of mixture A of 10 to 100 mg of KOH/g, for example, of above 1 to 20 wt. %, of at least one olefinically unsaturated, free-radically polymerizable monomer with at least one acid group,
c) 55 to below 98.5 wt. % of at least one olefinically unsaturated, free-radically polymerizable monomer without functional groups and
d) a wt. % proportion corresponding to a hydroxyl value of mixture A of 0 to below 60 mg of KOH/g, for example of 0 to 20 wt. %, of at least one olefinically unsaturated, free-radically polymerizable monomer with at least one hydroxyl group, wherein the weight percentages add up to 100 wt. %.

In particular, mixture A may consist of
a) 0.5 to 3 wt. % of at least one olefinically polyunsaturated, free-radically polymerizable monomer,
b) a proportion in the range from above 1 to 10 wt. % and simultaneously corresponding to an acid value of mixture A of 10 to 100 mg of KOH/g of at least one olefinically unsaturated, free-radically polymerizable monomer with at least one acid group,
c) 77 to below 97.5 wt. % of at least one olefinically unsaturated, free-radically polymerizable monomer without functional groups and
d) a proportion in the range from above 1 to 10 wt. % and simultaneously corresponding to a hydroxyl value of mixture A of 5 to 30 mg of KOH/g of at least one olefinically unsaturated, free-radically polymerizable monomer with at least one hydroxyl group, wherein the weight percentages add up to 100 wt. %.

The description and the claims mention at least one mixture B. If more than one mixture B is used, these may be apportioned simultaneously or successively. Preferably, only a single mixture B is used, in which case the process according to the invention is a two-stage emulsion polymerization, in which mixture A is polymerized in process step 1) and mixture B is polymerized in process step 3).

The preferably only one, or in the case of two or more mixtures B, each of the mixtures B comprises at least one olefinically unsaturated, free-radically polymerizable monomer with at least one acid group in a proportion corresponding to an acid value of the mixture of below 5 mg of KOH/g, at least one olefinically unsaturated, free-radically polymerizable monomer with at least one hydroxyl group in a proportion corresponding to a hydroxyl value of the mixture of below 5 mg of KOH/g and 0.5 to 5 wt. % of at least one olefinically polyunsaturated, free-radically polymerizable monomer. Mixture B or the mixtures B preferably contain neither olefinically unsaturated, free-radically polymerizable monomers with at least one acid group nor olefinically unsaturated, free-radically polymerizable monomers with at least one hydroxyl group.

Examples of olefinically polyunsaturated, free-radically polymerizable monomers and of olefinically unsaturated, free-radically polymerizable monomers with at least one acid group or with at least one hydroxyl group are the same as those described in connection with mixture A.

Apart from the at least one olefinically polyunsaturated, free-radically polymerizable monomer and the possible, but preferably absent, olefinically unsaturated, free-radically polymerizable monomer with at least one acid group or with at least one hydroxyl group, the at least one mixture B contains at least one further olefinically unsaturated, free-radically polymerizable monomer without functional groups. Examples of such non-functionalized olefinically unsaturated, free-radically polymerizable monomers are the same as those described in connection with mixture A.

For example, mixture B or each of the mixtures B may consist of
a) 0.5 to 5 wt. % of at least one olefinically polyunsaturated, free-radically polymerizable monomer,
b) a wt. % proportion corresponding to an acid value of mixture(s) B of 0 to below 5 mg of KOH/g, for example, of 0 to below 1 wt. %, of at least one olefinically unsaturated, free-radically polymerizable monomer with at least one acid group, c) a wt. % proportion corresponding to a hydroxyl value of mixture(s) B of 0 to below 5 mg of KOH/g, for example, of 0 to below 2 wt. %, of at least one olefinically unsaturated, free-radically polymerizable monomer with at least one hydroxyl group and d) above 92 to 99.5 wt. % of at least one olefinically unsaturated, free-radically polymerizable monomer without functional groups, wherein the weight percentages add up to 100 wt. %.

In particular, mixture B or each of the mixtures B may consist of a) 0.5 to 3 wt. % of at least one olefinically polyunsaturated, free-radically polymerizable monomer and b) 97 to 99.5 wt. % of at least one olefinically unsaturated, free-radically polymerizable monomer without functional groups, wherein the weight percentages add up to 100 wt. %.

The process according to the invention permits the production of aqueous binder latices with solids contents of, for example, 30 to 60 wt. %.

On the basis of electron micrographs of approx. 90 nm thick microtome sections of dried layers produced from the aqueous binder latices, it proved possible to establish that the individual latex particles in general have the structure of two directly interconnected bubbles, comparable with the appearance of the numeral 8. It is believed that this particle morphology is the underlying cause of the remarkable rheological properties of the aqueous binder latices according to the invention. These binder latices in fact exhibit pronounced pseudoplasticity combined with likewise pronounced thixotropic properties.

Using the aqueous binder latices according to the invention, it is possible to formulate aqueous coating compositions which are distinguished by particular rheological properties. In practice, the aqueous coating compositions are distinguished by excellent sagging properties, i.e. by a low tendency to sag. If the aqueous coating compositions are coating compositions containing special effect pigments (effect flake pigments), these compositions are distinguished by excellent development of the special effect (excellent flake orientation), for example, an excellent metallic effect. The virtually complete or complete absence of a tendency towards mottling (formation of clouds) is noteworthy.

For example, water-borne base coats suitable for the production of base coat/clear coat two-layer coatings may be formulated with the aqueous binder latices according to the invention.

Water-borne base coats are produced by mixing pigments with the aqueous binder latices according to the invention and with the following in each case optional constituents: further binders, crosslinking agents, fillers (extenders), conventional coating additives and organic solvents.

The water-borne base coats have solids contents of, for example, 10 to 45 wt. %, preferably of 15 to 35 wt. %. The ratio by weight of pigment content to the resin solids content is, for example, from 0.05:1 to 2:1, for special-effect waterborne base coats it is, for example, preferably 0.06:1 to 0.6:1, for solid color (single-tone) water-borne base coats it is preferably higher, for example, 0.06:1 to 2:1, in each case relative to the weight of solids. Apart from water, at least one pigment, the resin solids content, which comprises at least one binder introduced by an aqueous binder latex according to the invention, optionally one or more further binders differing therefrom and optionally one or more crosslinking agents, optionally one or more fillers and optionally one or more organic solvents, the water-borne base coats in general also contain one or more conventional coating additives. The at least one binder introduced by an aqueous binder latex according to the invention and the optional further binders differing therefrom form the binder solids content. The phrase "optionally further binders differing therefrom" includes not only binder resins but also pigment grinding resins. The binder introduced by an aqueous binder latex according to the invention may be the sole binder. If, in addition to the at least one binder introduced by an aqueous binder latex according to the invention, further binders differing therefrom are also present, the proportion thereof in the binder solids content is, for example, 20 to 80 wt. %.

Examples of binders differing from the binders introduced by an aqueous binder latex according to the invention are conventional film-forming, water-dilutable binders familiar to the person skilled in the art, such as water-dilutable polyester resins, water-dilutable (meth)acrylic copolymer resins or water-dilutable polyester/(meth)acrylic copolymer hybrids and water-dilutable polyurethane resins or polyurethane/(meth)acrylic copolymer hybrids. These may be reactive or non-functional resins.

The water-borne base coats may be self drying (physically drying), self crosslinking or externally crosslinking. Accordingly, the water-borne base coats may contain crosslinking agents, such as, for example, free or blocked polyisocyanates or amino resins, for example, melamine resins. Selection of the optionally used crosslinking agents depends on the type of crosslinkable groups in the binders and is familiar to the person skilled in the art. The crosslinking agents may be used individually or in combination. The mixing ratio of crosslinking agent solids to binder solids amounts, for example, to 10:90 to 40:60, preferably 20:80 to 30:70.

The water-borne base coats contain conventional coating pigments, for example, special effect pigments and/or pigments selected from among white, colored and black pigments.

Examples of special effect pigments are conventional pigments which impart to a coating a color and/or lightness flop dependent on the angle of observation, such as metal pigments, for example, made from aluminum, copper or other metals, interference pigments such as, for example, metal oxide coated metal pigments, for example, iron oxide coated aluminum, coated mica such as, for example, titanium dioxide coated mica, pigments which produce a graphite effect, iron oxide in flake form, liquid crystal pigments, coated aluminum oxide pigments, coated silicon dioxide pigments.

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, perylene pigments.

The water-borne base coats may also contain fillers, for example, in proportions of 0 to 30 wt. % relative to the resin solids content. Fillers do not constitute part of the pigment content. Examples are barium sulfate, kaolin, talcum, silicon dioxide, layered silicates.

Special effect pigments are in general initially introduced in the form of a conventional commercial aqueous or non-aqueous paste, optionally combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special water-dilutable paste resin. The formulation is then made up with the remaining proportion of the aqueous binder or of the aqueous paste resin.

The water-borne base coats may contain conventional coating additives in conventional quantities, for example, of 0.1 to 5 wt. %, relative to the solids content thereof. Examples are neutralizing agents, antifoaming agents, wetting agents, adhesion promoters, catalysts, levelling agents, anticratering agents, thickeners and light stabilizers.

The water-borne base coats may contain conventional coating solvents, for example, in a proportion of preferably less than 20 wt. %, particularly preferably of less than 15 wt. %. These are conventional coating solvents, which may originate, for example, from the production of the binders or are added separately. Examples of such solvents are mono- or polyhydric alcohols, for example, propanol, butanol, hexanol; glycol ethers or esters, for example, diethylene glycol dialkyl ether, dipropylene glycol dialkyl ether, in each case with C1-6 alkyl, ethoxypropanol, ethylene glycol monobutyl ether; glycols, for example, ethylene glycol, propylene glycol and the oligomers thereof; N-alkylpyrrolidones, such as, for example, N-methylpyrrolidone; ketones such as methyl ethyl ketone, acetone, cyclohexanone and aromatic or aliphatic hydrocarbons.

The water-borne base coats may be used for the production of the color- and/or special effect-imparting coating layer within a base coat/clear coat two-layer coating. The water-borne base coats may be applied by conventional methods. They are preferably applied by spraying to a dry film thickness of, for example, 8 to 40 μm; for special-effect water-borne base coats the dry film thickness is, for example, 8 to 25 μm, while for solid color water-borne base coats it is preferably greater, for example, 10 to 40 μm. Application preferably proceeds by the wet-on-wet process, i.e. after a flash-off phase, for example, at 20 to 80° C., the water-borne base coat layers are overcoated with a clear coat to a dry film thickness of preferably 30 to 60 μm and dried or crosslinked together with the latter at temperatures of, for example, 20 to 150° C. Drying conditions are determined by the clear coat system used. Temperatures of 20 to 80° C. are, for example, preferred for repair purposes. For the purposes of mass-production coating, temperatures of above 100° C., for example, of above 110° C., are preferred.

All known clear coats are in principle suitable as the clear coat. Usable clear coats are here both solvent-containing one-component (1 pack) or two-component (2 pack) clear coats, water-dilutable 1 pack or 2 pack clear coats, powder clear coats or aqueous powder clear coat slurries.

Multilayer coatings produced in this manner may be applied onto various types of substrate. The substrates are generally of metal or of plastics. These are often precoated, i.e. plastics substrates may, for example, be provided with a plastics primer, metallic substrates generally have an electrophoretically applied primer and optionally additionally one or more further coating layers, such as, for example, a primer surfacer layer (filler layer). These layers are in general cured.

Multilayer coatings obtained with the water-borne base coats meet conventional present-day requirements placed upon automotive coatings. The water-borne base coats are accordingly suitable for original and repair vehicle coating, but may, however, also be used in other sectors, for example, plastics coating, in particular vehicle part coating.

EXAMPLES

Examples 1-11

Preparation of Aqueous Binder Latices

A reactor was charged with 688 pbw (parts by weight) of deionized water and 16 pbw of Rhodapex EST30 (anionic surfactant available from Rhodia; 30 wt. % in water). The water and surfactant charge was heated to 80° C. under nitrogen atmosphere and held at that temperature throughout the reaction. A first stirred monomer emulsion consisting of the ingredients listed in Table 1 was prepared separately. A solution of 3.2 pbw of ammonium peroxodisulfate (APS) in 100 pbw of deionized water was added to the reactor content and the first monomer emulsion was then slowly added to the reactor content. After all of the first monomer emulsion was in, the reactor content was held for an additional hour at 80° C., during which a second stirred monomer emulsion consisting of the ingredients listed in Table 1 and a solution of 13 pbw of 2-amino-2-methyl-1-propanol (90 wt. % in water) in 98 pbw of deionized water were separately prepared. Depending on the composition of the first monomer emulsion, the further preparation was carried out either according to a) or according to b), as described below.

a): In case the first monomer emulsion contained methacrylic acid, the aqueous 2-amino-2-methyl-1-propanol solution was added slowly to the reaction mixture and then, a solution of 1.1 pbw of ammonium peroxodisulfate (APS) in 70 pbw of deionized water was added slowly to the reactor content. The second monomer emulsion was then slowly added to the reaction content. After the addition was complete, the reactor content was held at 80° C. for an additional hour. The aqueous binder latex obtained was then cooled to room temperature.

b) In case the first monomer emulsion did not contain methacrylic acid, a solution of 1.1 pbw of ammonium peroxodisulfate (APS) in 70 pbw of deionized water was slowly added to the reactor content and then, the second monomer emulsion was added slowly to the reaction content. After the addition was complete, the reactor content was held at 80° C. for an additional hour. Then the aqueous 2-amino-2-methyl-1-propanol solution was added slowly to the reactor content. The aqueous binder latex obtained was then cooled to room temperature.

TABLE 1

|  | 1*) | 2*) | 3*) | 4**) | 5*) | 6**) | 7**) | 8**) | 9**) | 10**) | 11**) |
|---|---|---|---|---|---|---|---|---|---|---|---|
| | Ingredients of first monomer emulsion (in pbw): | | | | | | | | | | |
| Rhodapex EST30 | 45 | 45 | 45 | 45 | 45 | 45 | 45 | 45 | 45 | 45 | 45 |
| Deionized water | 349 | 174 | 524 | 349 | 349 | 349 | 349 | 349 | 349 | 349 | 349 |
| MMA | 317 | 183 | 451 | 320 | 318 | 320 | 317 | 335 | 335 | 338 | 338 |
| BA | 317 | 183 | 451 | 321 | 319 | 321 | 317 | 335 | 335 | 339 | 339 |

TABLE 1-continued

|  | 1*) | 2*) | 3*) | 4**) | 5*) | 6**) | 7**) | 8**) | 9**) | 10**) | 11**) |
|---|---|---|---|---|---|---|---|---|---|---|---|
| HEA | 36 | 20 | 52 | 36 | 36 | 36 | 36 | 36 | 36 | 36 | 36 |
| MAA | 36 | 20 | 52 | 36 | 36 | 36 | 36 | — | — | — | — |
| AMA | 7 | 4 | 10 | — | 4 | — | 7 | 7 | 7 | — | — |
| Ingredients of second monomer emulsion (in pbw): | | | | | | | | | | | |
| Rhodapex EST30 | 15 | 15 | 15 | 15 | 15 | 15 | 15 | 15 | 15 | 15 | 15 |
| Deionized water | 378 | 553 | 203 | 378 | 378 | 378 | 378 | 378 | 378 | 378 | 378 |
| MMA | 377 | 527 | 227 | 380 | 370 | 377 | 380 | 359 | 362 | 359 | 362 |
| BA | 327 | 477 | 177 | 331 | 320 | 327 | 331 | 309 | 313 | 309 | 313 |
| MAA | — | — | — | — | — | — | — | 36 | 36 | 36 | 36 |
| AMA | 7 | 10 | 4 | — | 21 | 7 | — | 7 | — | 7 | — |

*)according to the invention
**)comparative example
MMA, Methyl methacrylate
BA, Butyl acrylate
HEA, Hydroxyethyl acrylate
MAA, Methacrylic acid
AMA, Allyl methacrylate Example 12

Preparation of an Aqueous Polyurethane Binder Dispersion 1005 g of a straight-chain polyester (composed of adipic acid, isophthalic acid and hexanediol having a hydroxyl value of 102 mg KOH/g) were heated to 90° C. and 1.8 g of trimethylolpropane and 393 g of isophorone diisocyanate were added. The reaction was carried out at 90° C. until the NCO value was constant. After cooling to 60° C., a solution of 35.3 g of dimethylol propionic acid, 26.1 g triethylamine and 250 g N-methylpyrrolidone was added. After heating to 80° C., the reaction temperature was maintained until the NCO value was constant. The batch was mixed with a molar amount, based on the molar NCO-content, of deionized water, and the solution was kept at 80° C., until no more NCO was detectable. The batch was then converted into an aqueous dispersion having a solids content of 35 wt. % by adding deionized water.

Examples 13a-l

Preparation of Silver-Colored Waterborne Base Coats

Silver-colored waterborne base coats 13a-l were prepared by mixing the constituents listed in Table 2. Proportions are in pbw. Table 2 also shows the results of technological tests performed with the waterborne base coats.

TABLE 2

| | Waterborne base coats 13 | | | | | | | | | | |
|---|---|---|---|---|---|---|---|---|---|---|---|
| Constituents: | a*) | b*) | c*) | d**) | e*) | f**) | g**) | h**) | i**) | k**) | l**) |
| BE | 7.3 | 7.3 | 7.3 | 7.3 | 7.3 | 7.3 | 7.3 | 7.3 | 7.3 | 7.3 | 7.3 |
| Aluminum paste[1] | 5 | 5 | 5 | 5 | 5 | 5 | 5 | 5 | 5 | 5 | 5 |
| NMP | 1.6 | 1.6 | 1.6 | 1.6 | 1.6 | 1.6 | 1.6 | 1.6 | 1.6 | 1.6 | 1.6 |
| Binder dispersion of Example 12 | 10.6 | 10.6 | 10.6 | 10.6 | 10.6 | 10.6 | 10.6 | 10.6 | 10.6 | 10.6 | 10.6 |
| Deionized water | 10 | 10 | 10 | 10 | 10 | 10 | 10 | 10 | 10 | 10 | 10 |
| Aqueous binder latex of Example 1 | 13.7 | — | — | — | — | — | — | — | — | — | — |
| Aqueous binder latex of Example 2 | — | 13.7 | — | — | — | — | — | — | — | — | — |
| Aqueous binder latex of Example 3 | — | — | 13.7 | — | — | — | — | — | — | — | — |
| Aqueous binder latex of Example 4 | — | — | — | 13.7 | — | — | — | — | — | — | — |
| Aqueous binder latex of Example 5 | — | — | — | — | 13.7 | — | — | — | — | — | — |
| Aqueous binder latex of Example 6 | — | — | — | — | — | 13.7 | — | — | — | — | — |

TABLE 2-continued

| Constituents: | Waterborne base coats 13 | | | | | | | | | | |
|---|---|---|---|---|---|---|---|---|---|---|---|
| | a*) | b*) | c*) | d**) | e*) | f**) | g**) | h**) | i**) | k**) | l**) |
| Aqueous binder latex of Example 7 | — | — | — | — | — | — | 13.7 | — | — | — | — |
| Aqueous binder latex of Example 8 | — | — | — | — | — | — | — | 13.7 | — | — | — |
| Aqueous binder latex of Example 9 | — | — | — | — | — | — | — | — | 13.7 | — | — |
| Aqueous binder latex of Example 10 | — | — | — | — | — | — | — | — | — | 13.7 | — |
| Aqueous binder latex of Example 11 | — | — | — | — | — | — | — | — | — | — | 13.7 |
| Deionized water | 10 | 10 | 10 | 10 | 10 | 10 | 10 | 10 | 10 | 10 | 10 |
| Layered silicate composition[2] | 10 | 10 | 10 | 10 | 10 | 10 | 10 | 10 | 10 | 10 | 10 |
| Maprenal ® MF 900[3] | 4.5 | 4.5 | 4.5 | 4.5 | 4.5 | 4.5 | 4.5 | 4.5 | 4.5 | 4.5 | 4.5 |
| Deionized water | 9 | 9 | 9 | 9 | 9 | 9 | 9 | 9 | 9 | 9 | 9 |
| Thickener[4] | 9 | 9 | 9 | 9 | 9 | 9 | 9 | 9 | 9 | 9 | 9 |
| DMEA, 10 wt. % solution in water | 2.9 | 2.9 | 2.9 | 2.9 | 2.9 | 2.9 | 2.9 | 2.9 | 2.9 | 2.9 | 2.9 |
| BuOH | 3 | 3 | 3 | 3 | 3 | 3 | 3 | 3 | 3 | 3 | 3 |
| DEGMBE | 3.4 | 3.4 | 3.4 | 3.4 | 3.4 | 3.4 | 3.4 | 3.4 | 3.4 | 3.4 | 3.4 |
| Brightness L* (units)[5] | 145 | 144 | 142 | 136 | 145 | 146 | 145 | 144 | 144 | 145 | 132 |
| Mottling[6] | + | + | + | + | + | − | + | − | − | − | − |
| Sagging limit (μm)[7] | >40 | >40 | >40 | 22 | >38 | 30 | 29 | 14 | 17 | 15 | 15 |
| Popping limit (μm)[7] | >40 | >40 | >40 | 25 | >38 | 32 | 32 | 20 | 22 | 18 | 19 |

*)according to the invention
**)comparative example
BE, Butoxy ethanol
NMP, N-Methyl pyrrolidone
BuOH, n-Butanol
DEGMBE, Diethylene glycol monobutyl ether
[1]Mixture of 50 pbw BE with 50 pbw Stapa Hydrolac ® WHH 2154 from Eckart.
[2]Mixture of 3 pbw Optigel ® SH from Sudchemie, 3 pbw polypropylene glycol 900 and 94 pbw of deionized water.
[3]Melamine resin from Surface Specialties.
[4]Mixture of 33 pbw Viscalex HV 30 from Allied Colloids, 2.5 pbw DMEA and 64.5 pbw of deionized water.
[5]The water-borne base coats were each applied to steel test panels provided with a precoating consisting of EDC primer and primer surfacer in 14 μm dry film thickness. After flashing-off for 5 minutes at 20° C. and additional 5 minutes at 80° C. the test panels were each spray coated with a commercial two-component polyurethane clear coat in 40 μm dry film thickness and after flashing-off for 5 minutes at 20° C. baked for 20 minutes at 140° C. object temperature.
The brightness L* (according to CIEL*a*b*, DIN 6174) at an illumination angle of 45 degrees to the perpendicular and an observation angle of 15 degrees to the specular was measured with the instrument X-Rite MA 68 sold by the firm X-Rite Incorporated, Grandeville, Michigan, U.S.A.
[6]The water-borne base coats were each applied to steel test panels (30 cm x 60 cm in size) provided with a precoating consisting of EDC primer and primer surfacer in 14 μm dry film thickness. After flashing-off for 5 minutes at 20° C. and additional 5 minutes at 80° C. the test panels were each spray coated with a commercial two-component polyurethane clear coat in 40 μm dry film thickness and after flashing-off for 5 minutes at 20° C. baked for 20 minutes at 140° C. object temperature. The coatings obtained were assessed for the occurrence of mottling phenomena (formation of clouds). Mottling occured: −; no mottling: +.
[7]The water-borne base coats were each applied with a wedge-shaped dry film thickness gradient of 0 to 40 μm to perforated steel test panels (30 cm x 60 cm in size; with perforations of 10 mm in diameter) provided with a precoating consisting of EDC primer and primer surfacer. After flashing-off for 5 minutes at 20° C. and additional 5 minutes at 80° C. the test panels were each spray coated with a commercial two-component polyurethane clear coat in 40 μm dry film thickness and after flashing-off for 5 minutes at 20° C. baked for 20 minutes at 140° C. object temperature. Both, the sagging limit of the base coat and the popping limit of the two-layer coating was determined in μm.

What is claimed is:

1. A process for the production of aqueous binder latices by multistage emulsion polymerization in the aqueous phase, comprising the successive steps:
   1) free-radically polymerizing a mixture A of olefinically unsaturated, free-radically polymerizable monomers, comprising at least one monomer with at least one acid group in a proportion corresponding to an acid value of mixture A of 10 to 100 mg of KOH/g and 0.5 to 5 wt. % of at least one olefinically polyunsaturated monomer, in the aqueous phase,
   2) neutralizing acid groups of the polymer formed in process step 1) and
   3) free-radically polymerizing at least one mixture B of olefinically unsaturated, free-radically polymerizable monomers, comprising at least one monomer with at least one acid group in a proportion corresponding to an acid value of mixture B or each of the mixtures B of 0 to below 5 mg of KOH/g, at least one monomer with at least one hydroxyl group in a proportion corresponding to a hydroxyl value of mixture B or each of the mixtures B of 0 to below 5 mg of KOH/g and at least one olefinically polyunsaturated monomer in a proportion of 0.5 to 5 wt. %, relative to mixture B or each of the mixtures B, in the presence of the product obtained in process step 2), wherein the ratio by weight of mixture A to the at least one mixture B is from 15:85 to 85:15 and wherein neutralization is not begun in process step 2) until at least 90 wt. % of the monomers of mixture A have been polymerized to completion.

2. The process of claim 1, wherein mixture A contains at least one olefinically unsaturated, free-radically polymerizable monomer with at least one hydroxyl group in a proportion corresponding to a hydroxyl value of mixture A of below 60 mg of KOH/g.

3. The process of claim 1, wherein mixture A consists of 0.5 to 5 wt. % of at least one olefinically polyunsaturated, free-radically polymerizable monomer, a wt.-% proportion corresponding to an acid value of mixture A of 10 to 100 mg of KOH/g of at least one olefinically unsaturated, free-radically polymerizable monomer with at least one acid group, 55 to below 98.5 wt. % of at least one olefinically unsaturated, free-radically polymerizable monomer without functional groups and a wt.% proportion corresponding to a hydroxyl value of mixture A of 0 to below 60 mg of KOH/g of at least one olefinically unsaturated, free-radically polymerizable monomer with at least one hydroxyl group, wherein the weight percentages add up to 100 wt. %.

4. The process of claim 1, wherein mixture A consists of 0.5 to 3 wt. % of at least one olefinically polyunsaturated, free-radically polymerizable monomer, above 1 to 10 wt. % simultaneously corresponding to an acid value of mixture A of 10 to 100 mg of KOH/g of at least one olefinically unsaturated, free-radically polymerizable monomer with at least one acid group, 77 to below 97.5 wt. % of at least one olefinically unsaturated, free-radically polymerizable monomer without functional groups and above 1 to 10 wt. % simultaneously corresponding to a hydroxyl value of mixture A of 5 to 30 mg of KOH/g of at least one olefinically unsaturated, free-radically polymerizable monomer with at least one hydroxyl group, wherein the weight percentages add up to 100 wt. %.

5. The process of claim 1, wherein only one mixture B is used.

6. The process of claim 1, wherein mixture B or each of the mixtures B consists of 0.5 to 5 wt. % of at least one olefinically polyunsaturated, free-radically polymerizable monomer, a wt.% proportion corresponding to an acid value of mixture(s) B of 0 to below 5 mg of KOH/g of at least one olefinically unsaturated, free-radically polymerizable monomer with at least one acid group, a wt. % proportion corresponding to a hydroxyl value of mixture(s) B of 0 to below 5 mg of KOH/g of at least one olefinically unsaturated, free-radically polymerizable monomer with at least one hydroxyl group and above 92 to 99.5 wt. % of at least one olefinically unsaturated, free-radically polymerizable monomer without functional groups, wherein the weight percentages add up to 100 wt. %.

7. The process of claim 1, wherein mixture B or each of the mixtures B consists of 0.5 to 3 wt. % of at least one olefinically polyunsaturated, free-radically polymerizable monomer and 97 to 99.5 wt. % of at least one olefinically unsaturated, free-radically polymerizable monomer without functional groups, wherein the weight percentages add up to 100 wt. %.

8. Aqueous binder latex produced by the process of claim 1.

9. An aqueous coating composition comprising the aqueous binder latex of claim 8 as binder.

10. A process for producing base coat/clear coat two-layer coatings, said process comprising:
applying an aqueous coating composition of claim 9 as water-borne base coat over a metal or a plastic substrate; and
coating said water-borne base coat with a clear coat.

* * * * *